US010397301B2

(12) United States Patent
DeLuca et al.

(10) Patent No.: US 10,397,301 B2
(45) Date of Patent: Aug. 27, 2019

(54) WEB PAGE VIEW CUSTOMIZATION

(71) Applicant: International Business Machines Corporation, Armonk, NY (US)

(72) Inventors: Lisa Seacat DeLuca, San Francisco, CA (US); Shelbee D. Eigenbrode, Thornton, CO (US); Dana L. Price, Surf City, NC (US); Aaron J. Quirk, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 14/847,993

(22) Filed: Sep. 8, 2015

(65) Prior Publication Data

US 2017/0068645 A1 Mar. 9, 2017

(51) Int. Cl.
*G06F 3/0484* (2013.01)
*G06F 17/21* (2006.01)
*H04L 29/08* (2006.01)
*G06F 16/957* (2019.01)

(52) U.S. Cl.
CPC .......... *H04L 67/02* (2013.01); *G06F 16/9577* (2019.01)

(58) Field of Classification Search
None
See application file for complete search history.

(56) References Cited

U.S. PATENT DOCUMENTS

| 6,959,319 B1* | 10/2005 | Huang | G06F 17/30867 |
| | | | 705/14.73 |
| 7,743,334 B2 | 6/2010 | Rider | |
| 8,527,869 B2* | 9/2013 | Hosea | G06F 17/30905 |
| | | | 707/732 |
| 2003/0167315 A1* | 9/2003 | Chowdhry | G06F 17/30873 |
| | | | 709/218 |
| 2004/0268232 A1* | 12/2004 | Tunning | G06F 9/451 |
| | | | 715/234 |
| 2010/0199195 A1 | 8/2010 | Carounanidy et al. | |
| 2013/0104026 A1 | 4/2013 | Reynar et al. | |

* cited by examiner

Primary Examiner — Nhat Huy T Nguyen
(74) Attorney, Agent, or Firm — Steven M. Greenberg, Esq.; Shutts & Bowen LLP

(57) ABSTRACT

Embodiments of the present invention provide a method, system and computer program product for Web page view customization. In an embodiment of the invention, a Web page view customization method includes receiving a request to load a Web page of a multiplicity of components by an end user and retrieving for the end user, a previously stored set of the components of the Web page. The method additionally includes rendering the Web page in a browser window of a Web browser of the end user so as to include based upon the previously stored set, only those of the multiplicity of components selected for inclusion while omitting from display in the Web page those of the multiplicity of components selected for exclusion.

15 Claims, 2 Drawing Sheets

WEB PAGE VIEW CUSTOMIZATION

BACKGROUND OF THE INVENTION

Field of the Invention

The present invention relates to user interface management and more particularly to Web page customization.

Description of the Related Art

The user interface of a computer program is that visual portion of a computer program through which end user interactions are both solicited and received, and through which programmatic output is displayed to the end user. The user interface generally includes one or more user interface controls with which the end user can direct programmatic commands to the underlying computer program and in which the programmatic output is displayed. Those controls include buttons, text input fields, checkboxes, static text fields and the like.

Customizing the number, nature and arrangement of the controls of a user interface long has been a generally expected feature of many computer programs. In this regard, it is widely understood that certain user interface controls, including tool bars and the content of tool bars can be configured for inclusion or exclusion from a user interface of a computer program based upon the individual preferences of each end user. In this way, the individual is afforded the opportunity to arrange the workspace of the end user in a manner most conducive to the way in which the end user interacts with the underlying computer program.

A Web site in many ways is an analog to a computer program. Like a computer program, a Web site includes a user interface—namely each Web page of the Web site, including a "home page". The home page generally refers to the first Web page presented when a requesting content browser issues a request to view a Web site. Also, like a computer program, some Web sites include different user interface controls with which an end user can direct programmatic commands to underlying computer program and in which the programmatic output is displayed to the end user.

Both the conventional computer program and the modern Web site allow for a degree of customization of a corresponding user interface when customization logic is included as part of the distribution. Specifically, in distributing a conventional computer program, a copy of the program typically exists for each end user and thus, the user interface for the computer program can vary from end user to end user dependent upon the individual preferences of each end user. Likewise, in a Web site, a single collection of Web pages are distributed to each end user, and individual preferences of each end user are stored so that the presentation of the Web pages are presented in accordance with the individual preferences. However, in both the circumstance of the conventional computer program and also the Web site, without the pre-determined permissive provision of customization functionality, the end user is unable to customize the nature, quantity and arrangement of user interface controls.

BRIEF SUMMARY OF THE INVENTION

Embodiments of the present invention address deficiencies of the art in respect to Web page customization and provide a novel and non-obvious method, system and computer program product for Web page view customization. In an embodiment of the invention, a Web page view customization method includes receiving a request to load a Web page of a multiplicity of components by an end user and retrieving for the end user a previously stored set of the components of the Web page. The method additionally includes rendering the Web page in a browser window of a Web browser of the end user so as to include, based upon the previously stored set, only those of the multiplicity of components selected for inclusion while omitting from display in the Web page those of the multiplicity of components selected for exclusion.

In one aspect of the embodiment, the method additionally includes parsing the Web page to identify the multiplicity of components and presenting in a separate browser window of the Web browser a selectable list of the multiplicity of the components. Thereafter, the previously stored set of the components is modified on account of selected ones of the multiplicity of the components in the list. Optionally, the parsing includes interrogating the Web page to determine each hypertext markup language (HTML) element defined for the Web page. As another option, the parsing additionally includes interrogating the Web page to determine each class referenced within the Web page. Finally, in yet another aspect of the embodiment, the method includes visually emphasizing in the Web page, each of the multiplicity of components of the selectable list presented in the separate browser window.

In another embodiment of the invention, a data processing system is configured for Web page view customization. The system includes a client computer with memory and at least one processor coupled to a Web server over a computer communications network. The system also includes a Web browser executing in the memory of the client computer a Web page view customization module coupled to the Web browser. The module includes program code enabled to detect a request to load a Web page of a multiplicity of components in the Web browser of an end user, to retrieve for the end user a previously stored set of the components of the Web page and to direct the rendering of the Web page in a browser window of the Web browser so as to include, based upon the previously stored set, only those of the multiplicity of components selected for inclusion while omitting from display in the Web page those of the multiplicity of components selected for exclusion.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and, together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for Web page view customization. In accordance with an embodiment of the invention, a Web page can be loaded in a browser window of a Web browser of an end user. The Web page can be parsed and, through the parsing, different components of the Web page can be identified and selectably presented in a different browser window of the Web browser. Thereafter, a set of selected ones of the components can be stored in connection with the end user and the Web page re-rendered in the browser window to include only those of the components selected for inclusion in a customized view of the Web page while others of the components selected for exclusion are omitted from display in the customized view. Subsequent requests to load the Web page by the end user are processed by locating the stored set of selected ones of the components so that once again, the Web page is rendered to include only those of the components selected for inclusion in a customized view of the Web page while others of the components selected for exclusion are omitted from display in the customized view.

Figure 1:
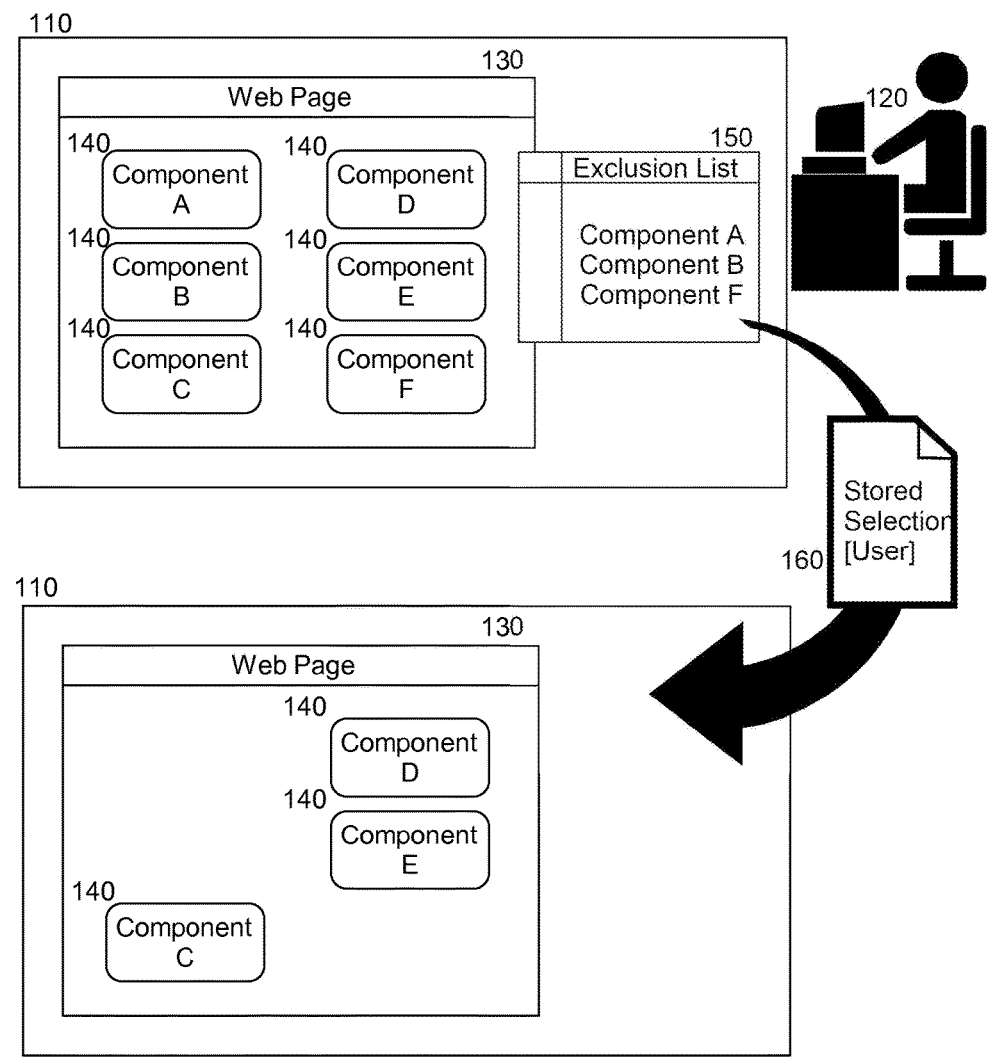
FIG. 1 is a pictorial illustration of a process for Web page view customization.

In further illustration, FIG. 1 pictorially shows a process for Web page view customization. As shown in FIG. 1, an end user 120 loads a Web page 130 in a Web browser 110. The Web page 130 includes a multiplicity of components 140. End user 120 can direct the display in a separate window 150 of a list of the components 140 of the Web page 130. The list of the components 140 in the separate window 150 is selectable in that the end user 120 may select individual ones of the components 140 so as to indicate a set of the components 140 to be excluded from subsequent renditions of the Web page 130. In this regard, the set of the components 140 is stored in user selection 160. Thereafter, in response to a request by the end user 120 to load the Web page 130, the end user 120 is identified and the user selection 160 for the end user retrieved. The components 140 of the Web page 130 selected from exclusion in accordance with the user selection 160 are then excluded from the rendering of the Web page 130. In this way, the Web page 130 is customized for the end user 120 without requiring the Web page 130 to include customization logic so as to permit the customization of the Web page 130 prior to service to the end user 120.

Figure 2:
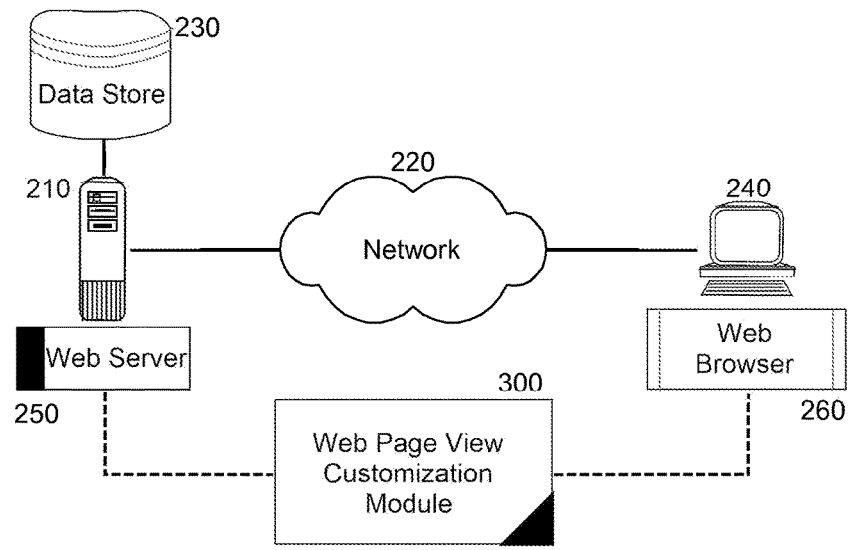
FIG. 2 is a schematic illustration of a data processing system configured for Web page view customization; and, FIG. 3 is a flow chart illustrating a process for Web page view customization.

The process described in connection with FIG. 1 is implemented in a data processing system. In yet further illustration, FIG. 2 schematically shows a data processing system configured for Web page view customization. The system includes a host computing system 210 that includes one or more computers, each with memory and at least one processor. The host computing system 210 supports the operation of a Web server 250 serving Web pages disposed in data store 230 to a requesting Web browser 260 operating in client computer 240 communicatively coupled to the host computing system 210 over computer communications network 220. Of note, a Web page view customization module 300 is coupled to either or both of the Web server 250 and the Web browser 260.

The Web page view customization module 300 includes program code that, when executed, responds to a request to the Web sever 250 by the Web browser 260 to retrieve a Web page on behalf of a particular end user. The response includes identifying the end user to determine whether or not the end user had previously stored a selection of components of the requested Web page based upon which one or more components of the Web page are to be excluded from display when rendering the Web page to the end user. If so, the components to be excluded from display are excluded when rendering the Web page to the end user. Thereafter, the end user may select additional components for inclusion in the selection so as to modify the selection for subsequent use when processing a request by the end user to render the Web page.

Figure 3:
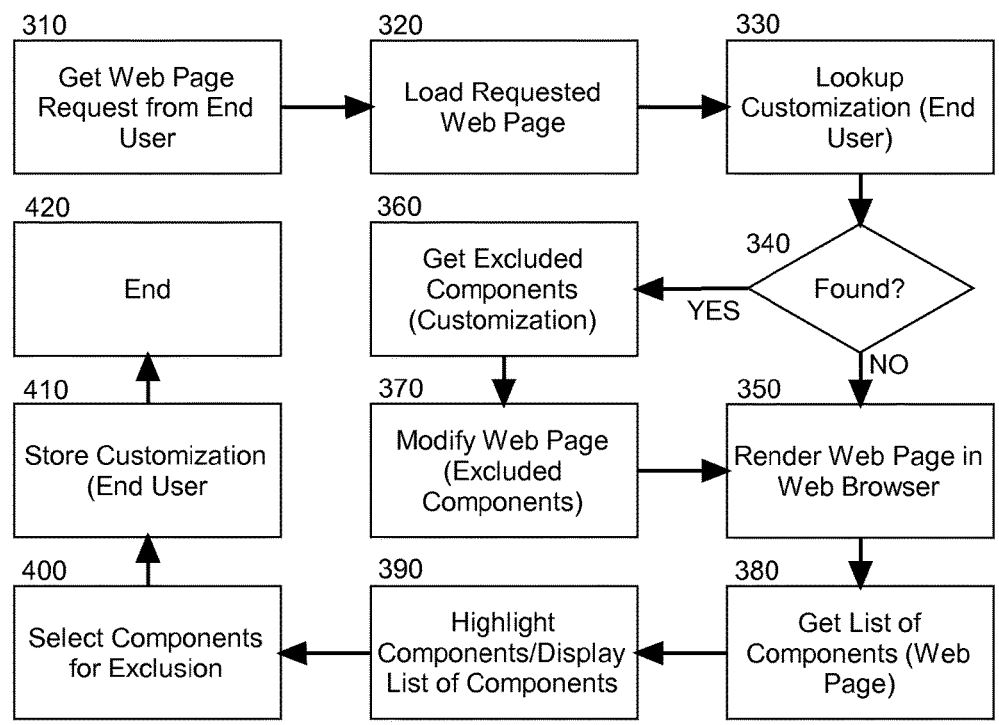

In even yet further illustration of the operation of the Web page view customization module 300, FIG. 3 is a flow chart illustrating a process for Web page view customization. Beginning in block 310, a Web page request is received from the end user and in block 320, the requested Web page is loaded into memory for processing. In block 330, an attempt is made to locate a previously stored customization associated with the end user and the Web page. In decision block 340, if a customization is found, in block 360 a set of excluded components of the Web page is determined from the customization. For instance, the customization may directly list those components to be excluded. Alternatively, the customization may implicitly specify those components to be excluded by listing those components to be included. In either circumstance, in block 370, the Web page is modified to exclude the components in the set and the Web page is rendered in the Web browser in block 350.

In block 380, the Web page is processed to identify those components of the Web page. For instance, a document object model (DOM) of the Web page is interrogated to identify the individual components of the Web page to determine each hypertext markup language (HTML) element defined for the Web page, or each class defined within the Web page. Thereafter, in block 390, the identified individual components are visually emphasized within the display of the Web page. Additionally, the individual components can be displayed in a list in a separate window of the Web browser. Subsequently, in block 400 one or more of the components are selected for exclusion in a subsequent display of the Web page. Finally, in block 410, the customization is modified and stored in association with the end user. In block 420, the process ends.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A Web page view customization method comprising:
receiving in memory of a computer a request to load a Web page of a multiplicity of components by an end user;
loading the Web page in response to the request in a display of the computer;
rendering in the display in a window separate from the loaded Web page, a list of the components in the Web page, the loaded Web page and the window with the list of the components in the loaded Web page being displayed concurrently with one another;
while the loaded Web page remains displayed, receiving in the window a selection of components to be excluded from subsequent renderings of the Web page and storing as a set in connection with the end user the selection of the components in the memory of the computer;
receiving a subsequent request in the memory to load the Web page and in response to the subsequent request:
loading the Web page in the memory of the computer including the components in the Web page;
retrieving for the end user, the previously stored set of the components of the Web page;
modifying the loaded Web page to remove from the Web page the stored set of components; and,
rendering the Web page in the display excluding from the display those of the components selected for exclusion in the set while concurrently displaying the separate window showing the list of the components in the Web page including the components removed from the Web page.

2. The method of claim 1, further comprising:
parsing the Web page to identify the multiplicity of components;
presenting in a separate browser window of the Web browser a selectable list of the multiplicity of the components; and,
modifying the previously stored set of the components on account of selected ones of the multiplicity of the components in the list.

3. The method of claim 2, wherein the parsing includes interrogating the Web page to determine each hypertext markup language (HTML) elements defined for the Web page.

4. The method of claim 3, wherein the parsing additionally includes interrogating the Web page to determine each class referenced within the Web page.

5. The method of claim 2, further comprising visually emphasizing in the Web page, each of the multiplicity of components of the selectable list presented in the separate browser window.

6. A data processing system configured for Web page view customization, the system comprising:
a client computer with memory and at least one processor coupled to a Web server over a computer communications network;
a Web browser executing in the memory of the client computer; and,
a Web page view customization module coupled to the Web browser, the module comprising program code enabled to detect a request to load a Web page of a multiplicity of components in the Web browser of an end user, to load the Web page in response to the request in a display of the client computer, to render in the display in a window separate from the loaded Web page, a list of the components in the Web page, the loaded Web page and the window with the list of the components in the loaded Web page being displayed concurrently with one another, to receive in the window a selection of components to be excluded from subsequent renderings of the Web page while the loaded Web page remains displayed, and to store as a set in connection with the end user the selection of the components in the memory of the computer, to receive a subsequent request in the memory to load the Web page and in response to the subsequent request:
to load the Web page in the memory of the computer including the components in the Web page;
to retrieve for the end user, the previously stored set of the components of the Web page to modify the loaded Web page to remove from the Web page the stored set of components; and
to direct the rendering in the display excluding from the display those of the components selected for exclusion in the set while concurrently displaying the separate window showing the list of the components in the Web page including the components removed from the Web page.

7. The system of claim 6, wherein the program code is further enabled to parse the Web page to identify the multiplicity of components, to direct the presentation in a separate browser window of the Web browser of a selectable list of the multiplicity of the components and to modify the previously stored set of the components on account of selected ones of the multiplicity of the components in the list.

8. The system of claim 7, wherein the program code parses the Web page by interrogating the Web page to determine each hypertext markup language (HTML) element defined for the Web page.

9. The system of claim 8, wherein the program code parses the Web page by additionally interrogating the Web page to determine each class referenced within the Web page.

10. The system of claim 7, wherein the program code is further enabled to direct the visually emphasis in the Web page of each of the multiplicity of components of the selectable list presented in the separate browser window.

11. A computer program product for Web page view customization, the computer program product comprising a non-transitory computer readable storage medium having program instructions embodied therewith, the program instructions executable by a device to cause the device to perform a method comprising:
receiving in memory of a computer a request to load a Web page of a multiplicity of components by an end user;
loading the Web page in response to the request in a display of the computer;
rendering in the display in a window separate from the loaded Web page, a list of the components in the Web page, the loaded Web page and the window with the list of the components in the loaded Web page being displayed concurrently with one another;

while the loaded Web page remains displayed, receiving in the window a selection of components to be excluded from subsequent renderings of the Web page and storing as a set in connection with the end user the selection of the components in the memory of the computer;

receiving a subsequent request in the memory to load the Web page and in response to the subsequent request:

loading the Web page in the memory of the computer including the components in the Web page;

retrieving for the end user, the previously stored set of the components of the Web page;

modifying the loaded Web page to remove from the Web page the stored set of components; and, rendering the Web page in the display excluding from the display those of the components selected for exclusion in the set while concurrently displaying the separate window showing the list of the components in the Web page including the components removed from the Web page.

12. The computer program product of claim 11, wherein the method further comprises:

parsing the Web page to identify the multiplicity of components;

presenting in a separate browser window of the Web browser a selectable list of the multiplicity of the components; and, modifying the previously stored set of the components on account of selected ones of the multiplicity of the components in the list.

13. The computer program product of claim 11, wherein the parsing includes interrogating the Web page to determine each hypertext markup language (HTML) element defined for the Web page.

14. The computer program product of claim 13, wherein the parsing additionally includes interrogating the Web page to determine each class referenced within the Web page.

15. The computer program product of claim 12, wherein the method further comprises visually emphasizing in the Web page, each of the multiplicity of components of the selectable list presented in the separate browser window.

* * * * *